US012026500B2

(12) United States Patent
Yamada et al.

(10) Patent No.: US 12,026,500 B2
(45) Date of Patent: Jul. 2, 2024

(54) SOFTWARE UPDATE DEVICE, SERVER, SOFTWARE UPDATE SYSTEM, AND SOFTWARE UPDATE METHOD

(71) Applicant: Mitsubishi Electric Corporation, Tokyo (JP)

(72) Inventors: Nozomi Yamada, Tokyo (JP); Satoshi Inashima, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 166 days.

(21) Appl. No.: 17/630,607

(22) PCT Filed: Sep. 30, 2019

(86) PCT No.: PCT/JP2019/038440
§ 371 (c)(1),
(2) Date: Jan. 27, 2022

(87) PCT Pub. No.: WO2021/064765
PCT Pub. Date: Apr. 8, 2021

(65) Prior Publication Data
US 2022/0253300 A1 Aug. 11, 2022

(51) Int. Cl.
*G06F 8/65* (2018.01)
*B60W 50/06* (2006.01)

(52) U.S. Cl.
CPC ............... *G06F 8/65* (2013.01); *B60W 50/06* (2013.01); *B60W 2556/45* (2020.02)

(58) Field of Classification Search
CPC ...... B60W 2556/45; B60W 50/06; G06F 8/65
See application file for complete search history.

(56) References Cited

U.S. PATENT DOCUMENTS 11,023,223 B2 * 6/2021 Ishikawa ................ H04W 4/40
2008/0263181 A1 10/2008 Nagata
(Continued)

FOREIGN PATENT DOCUMENTS

JP 2008-269395 A 11/2008
JP 5696018 B2 4/2015
(Continued)

OTHER PUBLICATIONS

International Search Report for PCT/JP2019/038440, dated Dec. 3, 2019.

*Primary Examiner* — Phillip H Nguyen
(74) *Attorney, Agent, or Firm* — Sughrue Mion, PLLC; Richard C. Turner

(57) ABSTRACT

An external communication unit receives, from a server, update information including information indicating an update target device whose software is to be updated among devices and information indicating a generation source device among the devices, the generation source device being installed with generation source software that is a source for generating update data to be used for updating update target software installed in the update target device. An update data generating unit generates, on the basis of the update information, the update data using the generation source software installed in a host device of the update data generating unit, when the host device is the generation source device. A software update unit updates, on the basis of the update information, the update target software installed in a host device of the software update unit using the generated update data, when the host device is the update target device.

6 Claims, 13 Drawing Sheets

(56) References Cited

U.S. PATENT DOCUMENTS

2013/0080580 A1     3/2013  Nagai et al.
2017/0351445 A1*   12/2017  Shimomura ........ G06F 15/7821
2018/0074811 A1*    3/2018  Kiyama .................. H04L 67/59

FOREIGN PATENT DOCUMENTS

| JP | 2020027636 A | * | 2/2020 | ........... G06F 3/0619 |
| KR | 20160118671 A | * | 10/2016 | ............... G06F 3/12 |
| WO | WO-2017046980 A1 | * | 3/2017 | ............. B60R 16/02 |

* cited by examiner

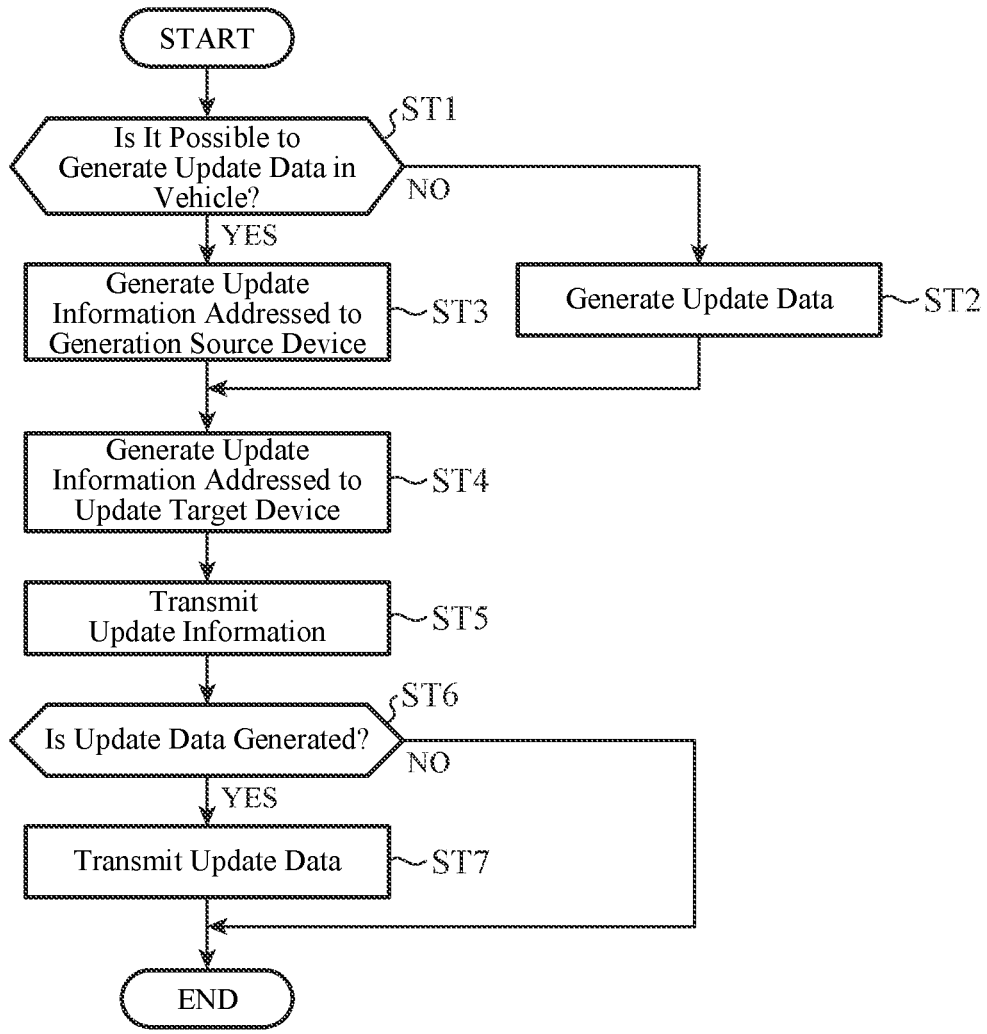

FIG. 7

| Destination | DEV_ID_100B |
|---|---|
| Update Information Addressed to Update Target Device | NO |
| Update Target Device | DEV_ID_100A |
| Memory Position of Generation Source Software | 0x0244 to 0x0300 |
| Output Format of Update Data | Binary File |

FIG. 8

| Destination | DEV_ID_100A | | |
|---|---|---|---|
| Update Information Addressed to Update Target Device | YES | | |
| Latest Version of Software | 2.0.0 | | |
| List of Update Data | Generation Source Device | Application Location (Memory Position) | Update Order |
| UpdateData_1 | DEV_ID_100B | 0x01aa to 0x0200 | 1 |
| UpdateData_2 | DEV_ID_100C | 0x00av to 0x00bb | 2 |
| ... | ... | ... | ... |

SOFTWARE UPDATE DEVICE, SERVER, SOFTWARE UPDATE SYSTEM, AND SOFTWARE UPDATE METHOD

CROSS REFERENCE TO RELATED APPLICATIONS

This application is a National Stage of International Application No. PCT/JP2019/038440 filed Sep. 30, 2019.

TECHNICAL FIELD

The present invention relates to a software update device, a server, a software update system, and a software update method.

BACKGROUND ART

In the related art, a method of updating software of a device mounted on a vehicle using over-the-air (OTA) has been proposed. In this method, a server generates update data on the basis of a difference between the latest software and the current software and transmits the update data to a device, and the device updates the current software to the latest software using the update data received from the server (see, for example, Patent Literature 1).

CITATION LIST

Patent Literature

Patent Literature 1: Japanese Patent No. 5696018

SUMMARY OF INVENTION

Technical Problem

When a device mounted on a vehicle receives update data from a server every time software is updated as described above, there is a disadvantage that the cost of wireless communication increases since the amount of data communication between the server and the vehicle increases.

The present invention has been made in order to solve a disadvantage as the above, and an object of the present invention is to reduce the amount of data communication between a server and a vehicle in updating software of a device mounted on the vehicle.

Solution to Problem

A software update device according to the present invention includes a plurality of devices mounted on a vehicle, wherein at least one of the plurality of devices includes: an network interface to receive, from a server outside the vehicle, update information including information indicating an update target device whose software is to be updated among the plurality of devices and information indicating a generation source device among the plurality of devices, the generation source device being installed with generation source software that is a source for generating update data to be used for updating update target software installed in the update target device, and each of the plurality of devices includes: a processor to execute a program; and a memory to store the program which, when executed by the processor, performs processes of, generating, on the basis of the update information received by the network interface, the update data using the generation source software installed in a host device of the processor, in a case where the host device is the generation source device; and updating, on the basis of the update information received by the network interface, the update target software installed in the host device using the update data generated by the generation source device, in a case where the host device is the update target device.

Advantageous Effects of Invention

According to the present invention, the update data to be used for updating the update target software installed in the update target device is generated not by the server but by the generation source device of the vehicle, and thus the amount of data communication between the server and the vehicle can be reduced as compared with a case where the update data is generated by the server.

BRIEF DESCRIPTION OF DRAWINGS

FIG. 5 is a flowchart illustrating an operation example of the server according to the first embodiment.

FIG. 6 is a table illustrating an example of software information managed by an update data generation determining unit.

FIG. 7 is a table illustrating an example of update information addressed to a generation source device.

FIG. 8 is a table illustrating an example of update information addressed to an update target device.

DESCRIPTION OF EMBODIMENTS

In order to describe the present invention further in detail, embodiments for carrying out the present invention will be described below with reference to the accompanying drawings.

First Embodiment

Figure 1:
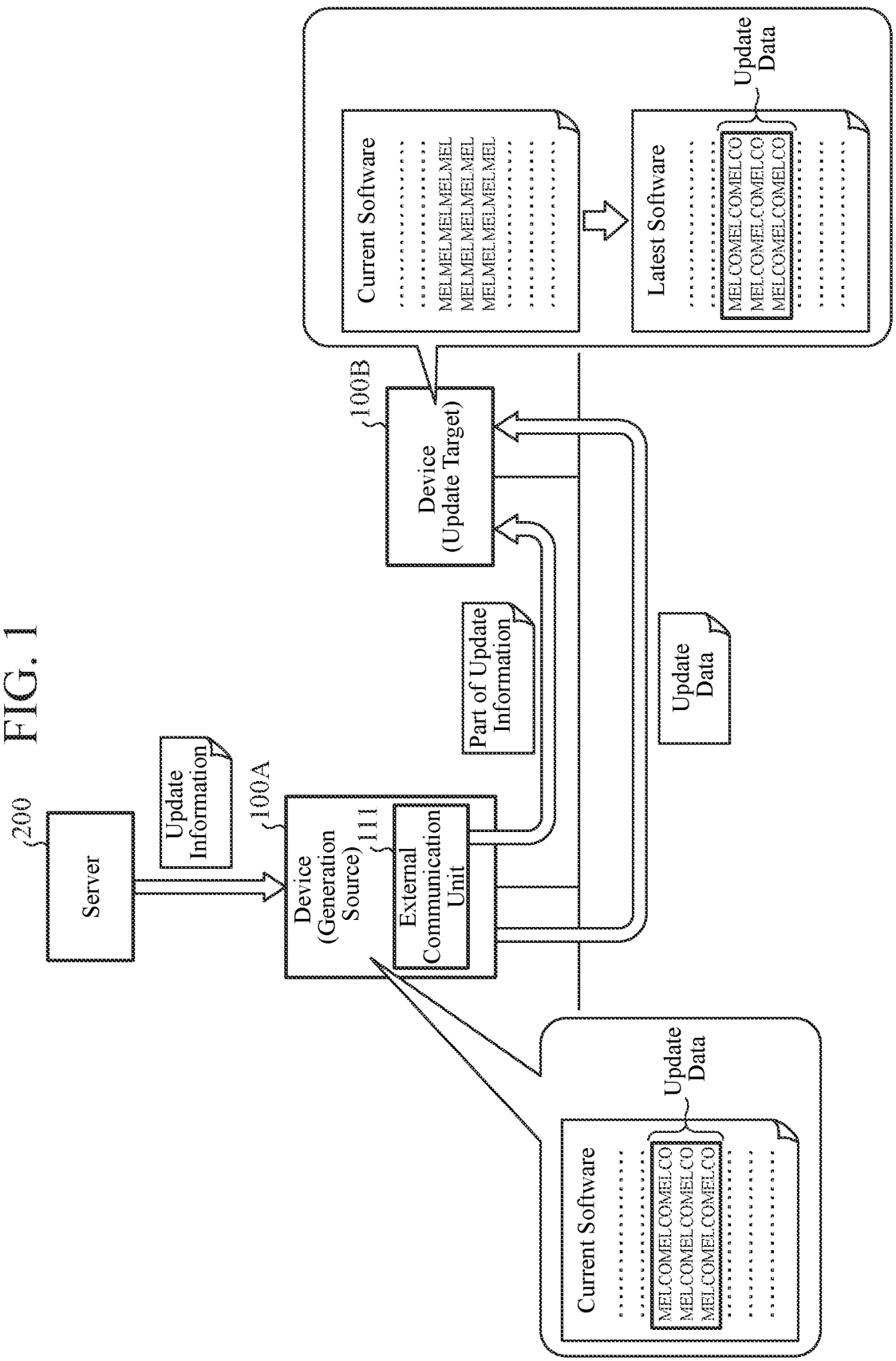
FIG. 1 is a diagram illustrating an outline of a software update system according to a first embodiment.

FIG. 1 is a diagram illustrating an outline of a software update system according to a first embodiment. This software update system updates software of a device mounted on a vehicle using OTA. In this software update system, update data to be used for software update is generated and distributed between devices 100A and 100B having similar systems. At this point, a server 200 manages the software update. Specifically, the server 200 manages information related to software installed in the devices 100A and 100B (hereinafter referred to as "software information") and determines whether or not the update data can be generated by the device 100A or 100B.

Note that devices having similar systems refer to devices having similar software configurations, devices controlling similar hardware, or the like. For example, in a case where the device 100A and the device 100B have a function of performing communication via a communication bus, the device 100A and the device 100B have similar software configurations related to this function. Furthermore, for example, in a case where the device 100A is a device that controls a vehicle-outside camera and the device 100B is a device that controls a vehicle-inside camera, the device 100A and the device 100B control similar hardware.

Here, a flow of a process of updating software of the device 100B will be described by referring to FIG. 1. Here, in a software update device including the device 100A and the device 100B mounted on the vehicle, the device 100A includes an external communication unit 111 that communicates with the server 200. In addition, it is assumed that the device 100B is an update target device.

First, the server 200 determines, on the basis of the software information of the devices 100A and 100B managed by the server 200, whether or not update data for the device 100B can be generated using the current software of the device 100A.

Subsequently, the server 200 requests the device 100A to generate update data for the device 100B. At this point, on the basis of the software information of the device 100A, the server 200 generates update information addressed to the device 100A and transmits the update information. The update information indicates a memory position or the like of the device 100A, and in the memory position the software to be used to generate the update data for the device 100B is stored.

Furthermore, the server 200 generates update information addressed to the device 100B indicating a software update procedure and the like and transmits the update information to the device 100B. The update procedure indicates, for example, which memory position of the device 100B the update data is to be applied to.

Then, the external communication unit 111 of the device 100A receives the update information addressed to the device 100A and the update information addressed to the device 100B from the server 200 and transmits the update information addressed to the device 100B to the device 100B. The device 100A generates the update data for the device 100B using the current software of the device 100A on the basis of the update information addressed to the device 100A and transmits the update data to the device 100B.

Subsequently, the device 100B performs update to the latest software by applying the update data generated by the device 100A to the current software of the device 100B on the basis of the update information addressed to the device 100B.

Next, a hardware configuration of the software update system will be described.

Figure 2:
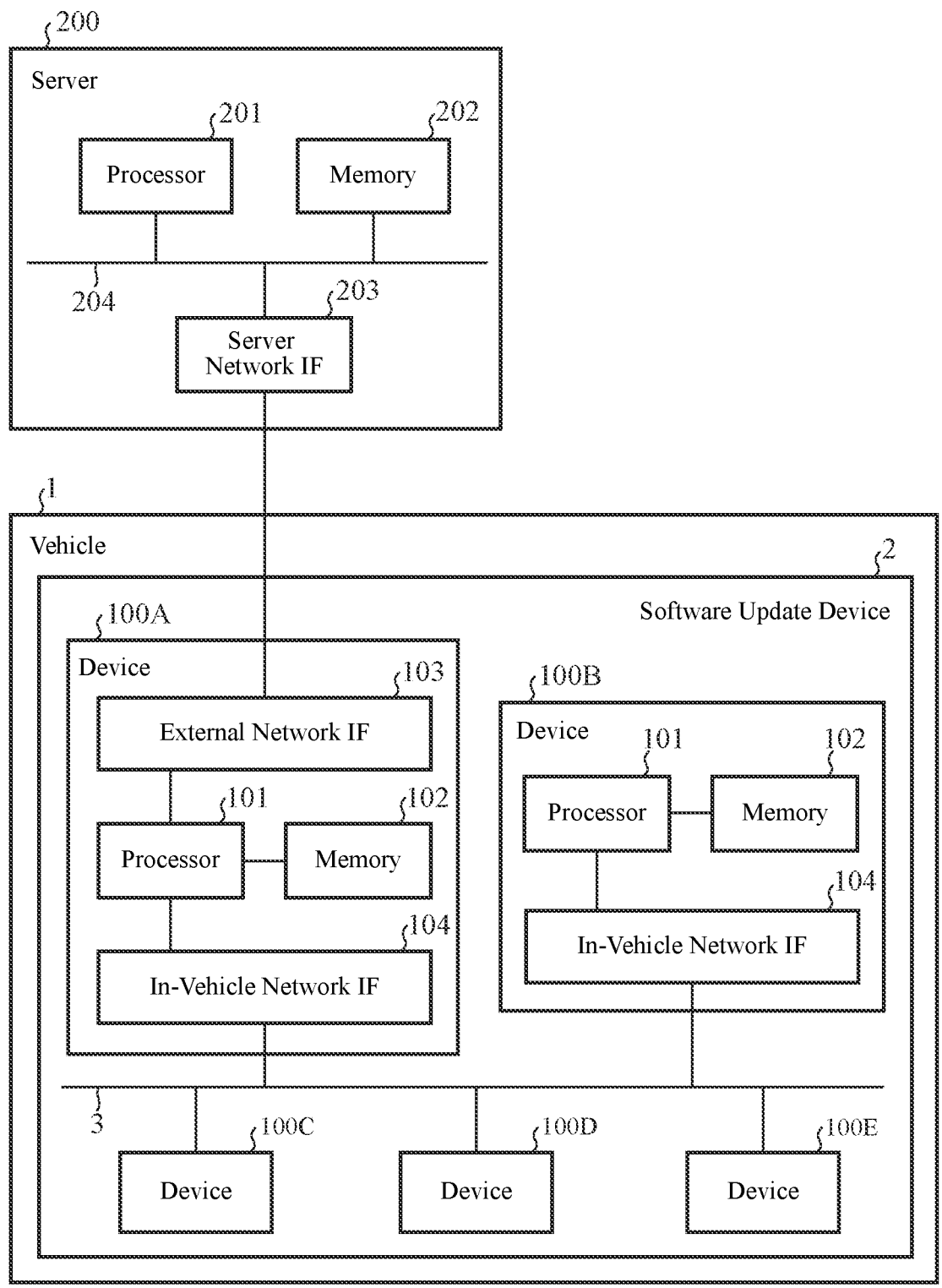
FIG. 2 is a diagram illustrating a hardware configuration example of the software update system according to the first embodiment.

FIG. 2 is a diagram illustrating a hardware configuration example of the software update system according to the first embodiment. A software update device 2 is mounted on a vehicle 1. The software update device 2 includes a plurality of devices 100A to 100E connected to each other by a communication bus 3. The devices 100A to 100E are electronic control units (ECUs) or the like. At least one device 100A of the plurality of devices 100A to 100E includes an external network interface (IF) 103 that corresponds to the external communication unit 111. The external network IF 103 performs wireless communication with the server 200 outside the vehicle. Each of the plurality of devices 100A to 100E includes a processor 101, a memory 102, and an in-vehicle network IF 104 as a basic configuration. A processor 101 performs processes such as calculation. A memory 102 stores information used by the host device. An in-vehicle network IF 104 communicates with other devices connected by the communication bus 3.

The server 200 includes a processor 201, a memory 202, and a server network IF 203. The processor 201, the memory 202, and the server network IF 203 are connected to each other by a communication bus 204. The processor 201 performs processes such as calculation. The memory 102 stores information used by the server 200. The server network IF 203 performs wireless communication with the vehicle 1.

Here, the processors 101 and 201 each refer to a central processing unit (CPU), a processing device, an arithmetic device, a microprocessor, or the like.

The memories 102 and 202 each may be a nonvolatile or volatile semiconductor memory such as a random access memory (RAM), a read only memory (ROM), an erasable programmable ROM (EPROM), or a flash memory, a magnetic disk such as a hard disk or a flexible disk, or an optical disk such as a compact disc (CD) or a digital versatile disc (DVD).

Next, each component of the software update system will be described.

Figure 3:
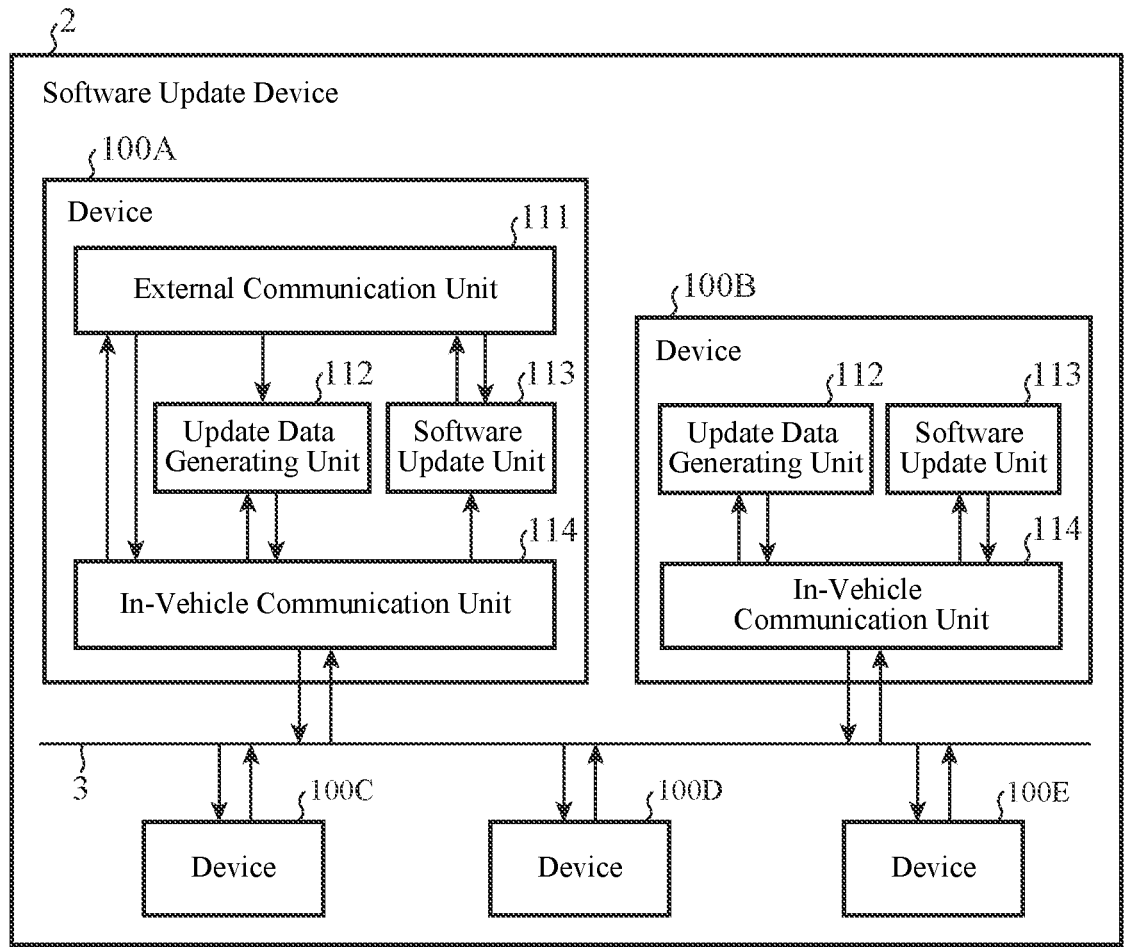
FIG. 3 is a functional block diagram illustrating a configuration example of a software update device according to the first embodiment.

FIG. 3 is a functional block diagram illustrating a configuration example of the software update device 2 according to the first embodiment. At least one device 100A of the plurality of devices 100A to 100E includes the external communication unit 111. Each of the plurality of devices 100A to 100E includes an update data generating unit 112, a software update unit 113, and an in-vehicle communication unit 114.

Figure 4:
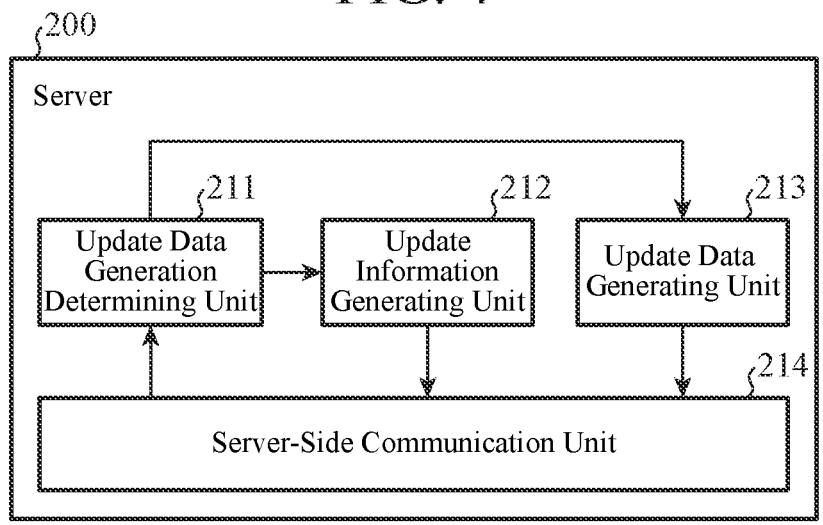
FIG. 4 is a functional block diagram illustrating a configuration example of a server according to the first embodiment.

The external communication unit 111 performs wireless communication with a server-side communication unit 214 (see FIG. 4). In a case where the external communication unit 111 receives data (including update data and update information) transmitted from the server 200, the external communication unit 111 outputs the data to the update data generating unit 112 or the software update unit 113 of the host device or transmits the data to another device through the in-vehicle communication unit 114 depending on the type and the destination of the received data. Furthermore, in a case where the external communication unit 111 receives data (including software information) from the software update unit 113 of the host device or from another device through the in-vehicle communication unit 114, the external communication unit 111 transmits the received data to the server 200.

An update data generating unit 112 generates, on the basis of the update information received from the external communication unit 111, update data for another device whose software is to be updated. The update data generating unit 112 transmits the update data that has been generated to the another device whose software is to be updated via the in-vehicle communication unit 114.

A software update unit 113 receives update data for the host device from another device through the in-vehicle communication unit 114 or receives update data for the host device from the server 200 through the external communication unit 111. The software update unit 113 updates software of the host device using the update data on the basis of the update information received from the external communication unit 111. The software update unit 113 of the device 100A further outputs software information, related to the software of the host device that has been updated, to the external communication unit 111. The software update units 113 of the devices 100B to 100E output software information, related to software of the host devices that has been updated, to the external communication unit 111 through the respective in-vehicle communication units 114.

An in-vehicle communication unit 114 communicates with other devices via the communication bus 3. In a case where the in-vehicle communication unit 114 receives update information addressed to the host device transmitted from the device 100A, the in-vehicle communication unit 114 outputs the update information to the update data generating unit 112 and the software update unit 113 of the host device. In a case where the in-vehicle communication unit 114 receives update data for the host device transmitted from another device, the in-vehicle communication unit 114 outputs the update data to the software update unit 113 of the host device. In addition, in a case where the in-vehicle communication unit 114 receives, from the update data generating unit 112 of the host device, update data for another device, the in-vehicle communication unit 114 transmits the update data to the another device. Furthermore, in a case where the in-vehicle communication unit 114 receives software information of the host device from the software update unit 113 of the host device, the in-vehicle communication unit 114 transmits the software information to the device 100A and thereby causes the software information to be transmitted to the server 200 through the external communication unit 111 of the device 100A.

Note that the function of the external communication unit 111 is implemented by the external network IF 103. The function of an in-vehicle communication unit 114 is implemented by an in-vehicle network IF 104.

The functions of an update data generating unit 112 and a software update unit 113 are implemented by a processor 101 that executes a program stored in a memory 102. The functions of the update data generating unit 112 and the software update unit 113 are implemented by software. The software is described as a program and stored in the memory 102. The processor 101 reads and executes the program stored in the memory 102 and thereby implements the functions of the units. That is, the devices 100A to 100E each include a memory 102 for storing a program, execution of which by a processor 101 results in execution of the steps illustrated in the flowchart of FIG. 9 or other drawings which will be described later. It can also be said that this program causes a computer to execute the procedures or methods performed by the update data generating unit 112 and the software update unit 113.

FIG. 4 is a functional block diagram illustrating a configuration example of the server 200 according to the first embodiment. The server 200 includes an update data generation determining unit 211, an update information generating unit 212, an update data generating unit 213, and the server-side communication unit 214.

The server-side communication unit 214 performs wireless communication with the external communication unit 111 of the device 100A. In a case where the server-side communication unit 214 receives software information from the external communication unit 111, the server-side communication unit 214 outputs the software information to the update data generation determining unit 211. Furthermore, the server-side communication unit 214 transmits update information received from the update information generating unit 212 and update data received from the update data generating unit 213 to the external communication unit 111.

The update data generation determining unit 211 stores and manages software information of the devices 100A to 100E received from the server-side communication unit 214. On the basis of the software information of these, the update data generation determining unit 211 determines whether or not the update data can be generated by at least one of the devices 100A to 100E and outputs the determination result to the update information generating unit 212 and the update data generating unit 213. Note that the software information is transmitted from the vehicle 1 periodically or when software of a device is updated.

In a case where the update data generation determining unit 211 determines that the update data can be generated in the vehicle 1, the update information generating unit 212 generates update information addressed to the generation source device that generates the update data and update information addressed to the update target device whose software is to be updated.

In a case where the update data generation determining unit 211 determines that the update data cannot be generated in the vehicle 1, the update information generating unit 212 generates update information addressed to the update target device, the update information indicating that software of the update target device is to be updated using the update data generated by the server 200.

The update information generating unit 212 transmits the update information that has been generated to the external communication unit 111 through the server-side communication unit 214.

In a case where the update data generation determining unit 211 determines that the update data cannot be generated in the vehicle 1, the update data generating unit 213 generates update data for the update target device on the basis of the software information managed by the update data generation determining unit 211. The update data generating unit 213 transmits the update data that has been generated to the external communication unit 111 through the server-side communication unit 214.

Note that the function of the server-side communication unit 214 is implemented by the server network IF 203.

The functions of the update data generation determining unit 211, the update information generating unit 212, and the update data generating unit 213 are implemented by the processor 201 that executes a program stored in the memory 202. The functions of the update data generation determining unit 211, the update information generating unit 212, and the update data generating unit 213 are implemented by software. The software is described as a program and stored in the memory 202. The processor 201 reads and executes the program stored in the memory 202 and thereby implements the functions of the units. That is, the server 200 includes the memory 202 for storing a program, execution of which by the processor 201 results in execution of the steps illustrated in the flowchart of FIG. 5 or other drawings which will be described later. It can also be said that this program causes a computer to execute the procedures or methods performed by the update data generation determining unit 211, the update information generating unit 212, and the update data generating unit 213.

Next, a software update method will be described.

FIG. 5 is a flowchart illustrating an operation example of the server 200 according to the first embodiment. In a case where the server 200 receives an instruction to update software installed in any one of the devices 100A to 100E externally, the server 200 performs the operation illustrated in the flowchart of FIG. 5. Hereinafter, it is assumed that the device 100A is the update target device.

In step ST1, the update data generation determining unit 211 determines whether or not update data for the update target device can be generated by at least one of the devices other than the update target device. If a device other than the update target device can generate the update data (step ST1 "YES"), the update information generating unit 212 performs the operation of step ST3, and if not (step ST1 "NO"), the update data generating unit 213 performs the operation of step ST2.

FIG. 6 is a table illustrating an example of software information managed by the update data generation determining unit 211. Software information includes, for example, a device ID, the current version of software, the latest version of the software, a memory map indicating a memory position where the software of the current version is stored, and software content of the current version. A device ID "DEV_ID_100A" indicates the device 100A whose software is to be updated, and a device ID "DEV_ID_100B" indicates the device 100B which is a generation source that generates the update data for the device 100A. The update data generation determining unit 211 compares the software information of the device 100A with the software information of the device 100B to determine whether or not the update data, which is a difference between the software of the current version and the software of the latest version of the device 100A, can be generated on the basis of software of the current version of the device 100B.

In step ST2, the update data generating unit 213 generates the update data for the update target device on the basis of the software information managed by the update data generation determining unit 211.

In step ST3, the update information generating unit 212 generates update information addressed to the generation source device that generates the update data.

The update information is desirably in a file format having a small data amount such as a text file.

FIG. 7 is a table illustrating an example of the update information addressed to the generation source device. The update information includes the destination, whether the update information is addressed to the update target device or addressed to the generation source device, the update target device, the address or the memory position of generation source software, the output format of the update data, and the like. The update information in FIG. 7 is addressed to the device 100B and indicates that the device 100B is the generation source device and that the device 100A is the update target device. On the basis of the update information of FIG. 7, the device 100B extracts software content stored in "0x0244 to 0x0300" of the memory 102 of the device 100B to generate the update data of a binary file and transmits the update data to the device 100A.

In step ST4, the update information generating unit 212 generates update information addressed to the update target device.

FIG. 8 is a table illustrating an example of the update information addressed to the update target device. The update information includes the destination, whether the update information is addressed to the update target device or addressed to the generation source device, the latest version of the software, a list of update data, a generation source device of each piece of the update data, the location (address, memory position, or the like) where each piece of the update data is to be applied, the update order indicating the application order of the update data, and the like. The update information in FIG. 8 is addressed to the device 100A and indicates that the device 100A is the update target device. On the basis of the update information in FIG. 8, the device 100A first applies update data "UpdateData_1" generated by the device 100B to "0x01aa to 0x0200" of the memory 102 of the device 100A and then applies update data "UpdateData_2" generated by the device 100C to "0x00av to 0x00bb" of the memory 102 of the device 100A.

Note that, although not illustrated, the item of the generation source device included in the update information addressed to the update target device is not limited to the devices 100A to 100E and may be the server 200.

In step ST5, the server-side communication unit 214 transmits the update information generated by the update information generating unit 212 to the external communication unit 111. At this point, the server-side communication unit 214 transmits the update information addressed to the update target device and the update information addressed to the generation source device in a case where the update data can be generated in the vehicle 1, and the server-side communication unit 214 transmits the update information addressed to the update target device in a case where the update data cannot be generated in the vehicle 1.

If the update data generating unit 213 has generated the update data in step ST2 (step ST6 "YES"), the server-side communication unit 214 transmits the update data to the external communication unit 111 in step ST7. On the other hand, if the update data generating unit 213 has not generated the update data (step ST6 "NO"), the server-side communication unit 214 skips the operation of step ST7.

Figure 9:
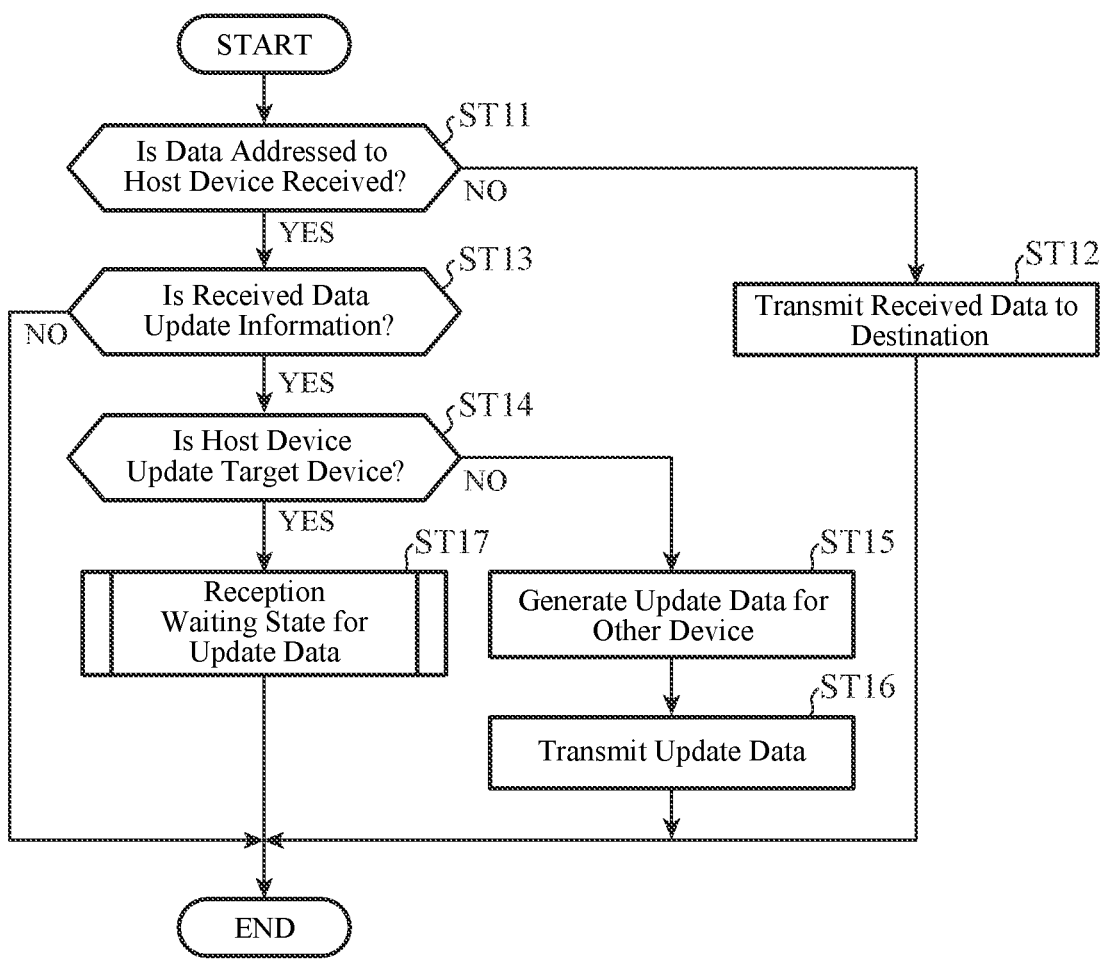
FIG. 9 is a flowchart illustrating an operation example of a device including an external communication unit among devices in the software update device according to the first embodiment.

FIG. 9 is a flowchart illustrating an operation example of the device 100A including the external communication unit 111 among the devices 100A to 100E in the software update device 2 according to the first embodiment.

In step ST11, if the external communication unit 111 receives data transmitted by the server 200, the external communication unit 111 checks the destination of the received data. In addition, in a case where the in-vehicle communication unit 114 receives data transmitted by the other devices 100B to 100E, the in-vehicle communication unit 114 checks the destination of the received data. The external communication unit 111 and the in-vehicle communication unit 114 perform the operation of step ST13 if the received data is addressed to the device 100A (step ST11 "YES") or perform the operation of step ST12 if the received data is addressed to any one of the other devices 100B to 100E (step ST11 "NO").

In step ST12, if the destination of the received data is the server 200, the external communication unit 111 transmits the received data to the server 200. In a case where the destination of the received data is any one of the other devices 100B to 100E, the in-vehicle communication unit 114 transmits the received data to the one of the other devices which is the destination.

In step ST13, the external communication unit 111 and the in-vehicle communication unit 114 check whether or not the received data is update information. The external communication unit 111 and the in-vehicle communication unit 114 perform the operation of step ST14 if the received data is update information (step ST13 "YES") or end the operation illustrated in the flowchart of FIG. 9 if the received data is not update information (step ST13 "NO").

In step ST14, the external communication unit 111 checks whether or not the device 100A is the update target device on the basis of the update information which is the received data. If the device 100A is the update target device (step ST14 "YES"), the external communication unit 111 outputs the update information to the software update unit 113, and the software update unit 113 performs the operation of step ST17. If the device 100A is not the update target device (step ST14 "NO"), the external communication unit 111 outputs the update information to the update data generating unit 112, and the update data generating unit 112 performs the operation of step ST15.

In step ST15, the update data generating unit 112 generates update data for the other device on the basis of the update information.

In step ST16, the in-vehicle communication unit 114 transmits the update data for the other device generated by the update data generating unit 112 to the other device.

Figure 10:
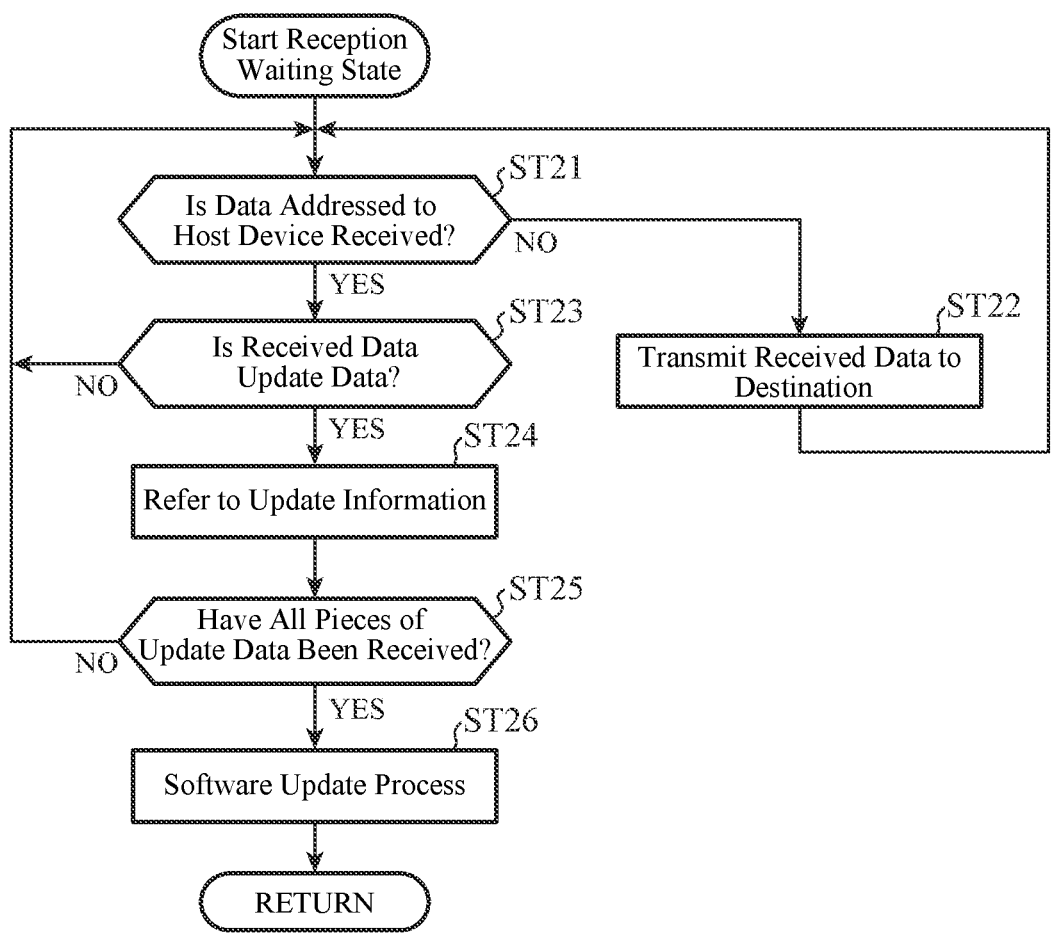
FIG. 10 is a flowchart illustrating an operation example which is performed in a reception waiting state for update data of FIG. 9, and which is performed by the device including the external communication unit.

FIG. 10 is a flowchart illustrating an operation example which is performed in the reception waiting state for the update data (step ST17) of FIG. 9, and which is performed by the device 100A including the external communication unit 111.

In step ST21, if the external communication unit 111 receives data transmitted by the server 200, the external communication unit 111 checks the destination of the received data. In addition, in a case where the in-vehicle communication unit 114 receives data transmitted by the other devices 100B to 100E, the in-vehicle communication unit 114 checks the destination of the received data. The external communication unit 111 and the in-vehicle communication unit 114 perform the operation of step ST23 if the received data is addressed to the device 100A (step ST21 "YES") or perform the operation of step ST22 if the received data is addressed to any one of the other devices 100B to 100E (step ST21 "NO").

In step ST22, if the destination of the received data is the server 200, the external communication unit 111 transmits the received data to the server 200. In a case where the destination of the received data is any one of the other devices 100B to 100E, the in-vehicle communication unit 114 transmits the received data to the one of the other devices which is the destination.

In step ST23, the external communication unit 111 and the in-vehicle communication unit 114 check whether or not the received data is update data. If the received data is update data (step ST23 "YES"), the external communication unit 111 and the in-vehicle communication unit 114 output the update data to the software update unit 113, and the software update unit 113 performs the operation of step ST24. If the received data is not update data (step ST23 "NO"), the external communication unit 111 and the in-vehicle communication unit 114 perform the operation of step ST21.

In step ST24, the software update unit 113 refers to the update information received from the external communication unit 111 and thereby checks, for example, the number of pieces of update data necessary for updating the software of the device 100A.

In step ST25, the software update unit 113 checks whether or not all pieces of update data necessary for updating the software of the device 100A have been prepared. If all the pieces of update data have been prepared (step ST25 "YES"), the software update unit 113 performs the operation of step ST26. If there is unreceived update data (step ST25 "NO"), the external communication unit 111 and the in-vehicle communication unit 114 perform the operation of step ST21.

In step ST26, the software update unit 113 updates the software of the device 100A in accordance with an update order included in the update information using all the pieces of update data necessary for updating the software of the device 100A. After completion of the update, the software update unit 113 transmits the latest software information to the server 200 through the external communication unit 111.

Figure 11:
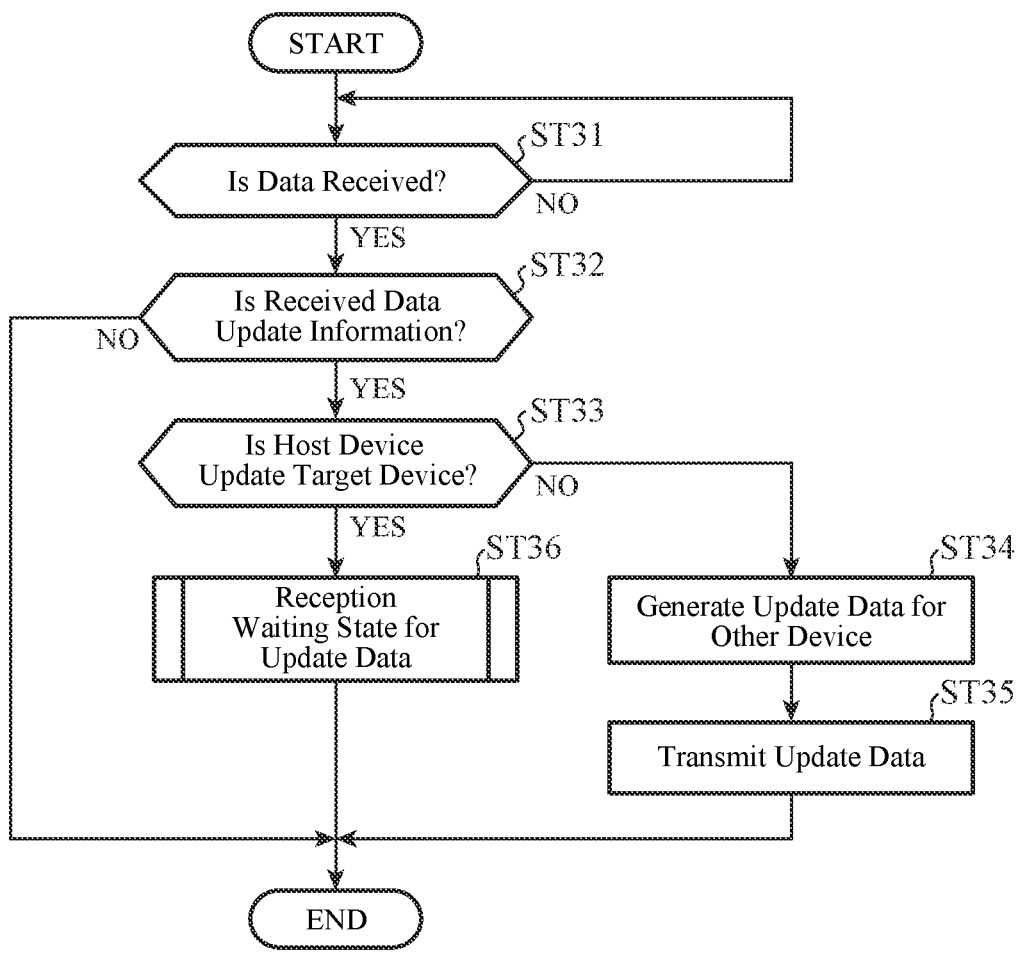
FIG. 11 is a flowchart illustrating an operation example of a device not including the external communication unit among the devices in the software update device according to the first embodiment.

FIG. 11 is a flowchart illustrating an operation example of the devices 100B to 100E that do not include the external communication unit 111 among the devices 100A to 100E of the software update device 2 according to the first embodiment. Since the operations of the devices 100B to 100E are the same, the operation of the device 100B will be described below as a representative.

In step ST31, the in-vehicle communication unit 114 receives data addressed to the device 100B via the communication bus 3. The in-vehicle communication unit 114 performs the operation of step ST32 if the in-vehicle communication unit 114 receives data (step ST31 "YES") or repeats the operation of step ST31 if the in-vehicle communication unit 114 receives no data (step ST31 "NO").

In step ST32, the in-vehicle communication unit 114 checks whether or not the received data is update information. The in-vehicle communication unit 114 performs the operation of step ST33 if the received data is update information (step ST32 "YES") or end the operation illustrated in the flowchart of FIG. 11 if the received data is not update information (step ST32 "NO").

In step ST33, the in-vehicle communication unit 114 checks whether or not the device 100B is the update target device on the basis of the update information which is the received data. If the device 100B is the update target device (step ST33 "YES"), the in-vehicle communication unit 114 outputs the update information to the software update unit 113, and the software update unit 113 performs the operation of step ST36. If the device 100B is not the update target device (step ST33 "NO"), the in-vehicle communication unit 114 outputs the update information to the update data generating unit 112, and the update data generating unit 112 performs the operation of step ST34.

In step ST34, the update data generating unit 112 generates update data for the other device on the basis of the update information.

In step ST35, the in-vehicle communication unit 114 transmits the update data for the other device generated by the update data generating unit 112 to the other device.

Figure 12:
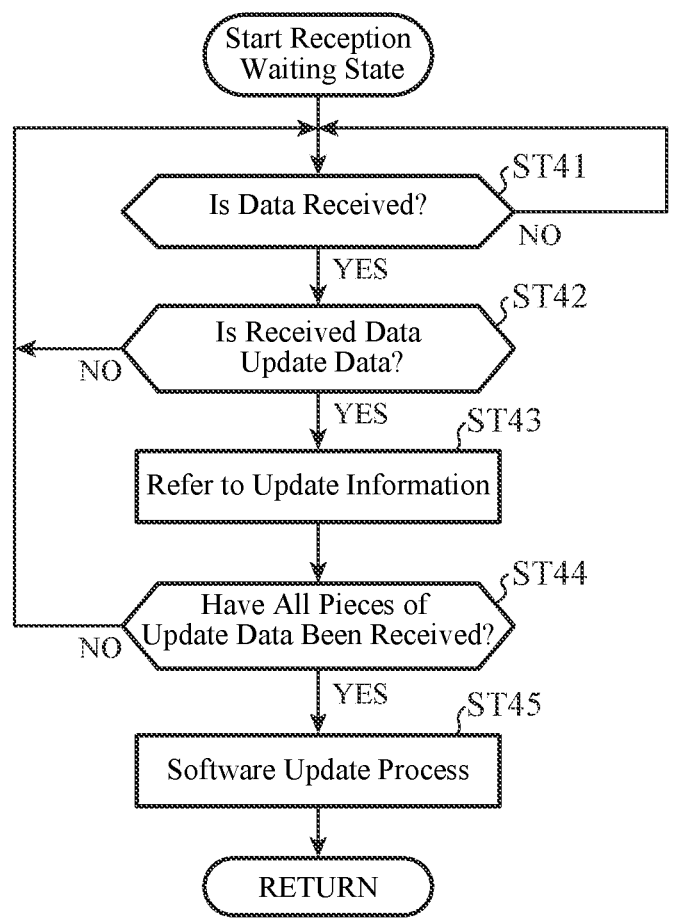
FIG. 12 is a flowchart illustrating an operation example which is performed in a reception waiting state for update data of FIG. 11, and which is performed by the device not including the external communication unit.

FIG. 12 is a flowchart illustrating an operation example which is performed by the devices 100B to 100E not including the external communication unit 111, and which is performed in the reception waiting state for the update data (step ST36) of FIG. 11.

In step ST41, the in-vehicle communication unit 114 receives data addressed to the device 100B through the communication bus 3. The in-vehicle communication unit 114 performs the operation of step ST42 if the in-vehicle communication unit 114 receives the data (step ST41 "YES") or repeats the operation of step ST41 if the in-vehicle communication unit 114 receives no data (step ST41 "NO").

In step ST42, the in-vehicle communication unit 114 checks whether or not the received data is update data. If the received data is update data (step ST42 "YES"), the in-vehicle communication unit 114 outputs the update data to the software update unit 113, and the software update unit 113 performs the operation of step ST43. If the received data is not update data (step ST42 "NO"), the in-vehicle communication unit 114 performs the operation of step ST41.

In step ST43, the software update unit 113 refers to the update information received from the in-vehicle communication unit 114 and thereby checks, for example, the number of pieces of update data necessary for updating the software of the device 100B.

In step ST44, the software update unit 113 checks whether or not all pieces of update data necessary for updating the software of the device 100B have been prepared. If all the pieces of update data have been prepared (step ST44 "YES"), the software update unit 113 performs the operation of step ST45. If there is unreceived update data (step ST44 "NO"), the in-vehicle communication unit 114 performs the operation of step ST41.

In step ST45, the software update unit 113 updates the software of the device 100B in accordance with an update order included in the update information using all the pieces of update data necessary for updating the software of the device 100B. After completion of the update, the software update unit 113 outputs the latest software information to the in-vehicle communication unit 114. The in-vehicle communication unit 114 transmits the software information to the server 200 through the external communication unit 111 of the device 100A.

As described above, at least one device 100A of the plurality of devices 100A to 100E included in the software update device 2 according to the first embodiment includes the external communication unit 111. The external communication unit 111 receives, from the server 200 outside the vehicle, update information including information indicating an update target device whose software is to be updated among the plurality of devices 100A to 100E and information indicating a generation source device among the plurality of devices 100A to 100E, the generation source device being installed with generation source software that is a source for generating update data to be used for updating update target software installed in the update target device. Each of the plurality of devices 100A to 100E includes an update data generating unit 112 and a software update unit 113. An update data generating unit 112 generates, on the basis of the update information received by the external communication unit 111, the update data using the generation source software installed in the host device of the update data generating unit 112, in a case where the host device is the generation source device. A software update unit 113 updates, on the basis of the update information received by the external communication unit 111, the update target software installed in the host device of the software update unit 113 using the update data generated by the generation source device, in a case where the host device is the update target device. As described above, since any one of the devices 100A to 100E of the vehicle 1 generates the update data, the amount of data communication between the server 200 and the vehicle 1 can be reduced as compared with the case where the server 200 generates the update data as in the related art. In addition, in a case where the server 200 generates update data as in the related art, when the radio wave environment around the vehicle 1 is poor, there is a possibility that it takes time for the vehicle 1 to receive the update data from the server 200 or the vehicle 1 cannot receive the update data. Thus, there is a possibility that software update cannot be performed. On the other hand, in the vehicle 1 of the first embodiment, software can be updated when update information, which has a data amount smaller than that of update data, can be received. Thus, it is possible to update the software even when the radio wave environment around the vehicle 1 is poor.

In addition, the server 200 according to the first embodiment includes the update data generation determining unit 211, the update information generating unit 212, and the server-side communication unit 214. The update data generation determining unit 211 compares update target software installed in an update target device whose software is to be updated among the plurality of devices 100A to 100E mounted on the vehicle 1 with software installed in the rest of the devices, and thereby determines whether or not update data to be used for updating the update target software installed in the update target device can be generated on the basis of the software installed in the rest of the devices. The update information generating unit 212 sets, as a generation source device installed with generation source software that is a source for generating the update data, a device which is determined by the update data generation determining unit 211 to be capable of generating the update data, and generates update information including information indicating the generation source device and information indicating the update target device. The server-side communication unit 214 transmits the update information generated by the update information generating unit 212 to the vehicle 1. As described above, since the server 200 causes any one of the devices 100A to 100E of the vehicle 1 to generate the update data, the amount of data communication between the server 200 and the vehicle 1 can be reduced as compared with the case where the server 200 generates the update data as in the related art. In addition, in a case where the server 200 generates update data as in the related art, when the radio wave environment around the vehicle 1 is poor, there is a possibility that it takes time for the vehicle 1 to receive the update data from the server 200 or the vehicle 1 cannot receive the update data. Thus, there is a possibility that software update cannot be performed. On the other hand, the server 200 of the first embodiment transmits update information having a data amount smaller than that of update data. Thus, it is possible to cause the vehicle 1 to perform software update even when the radio wave environment around the vehicle 1 is poor.

Second Embodiment

In a software update system according to a second embodiment, in a case where any one of devices 100A to 100E can generate a part of update data, the one of the devices 100A to 100E generates the part, and a server 200 generates the rest.

Here, a part of update data generated by a generation source device is referred to as "first update data", and the remaining part of the update data generated by the server 200 is referred to as "second update data".

Figure 13:
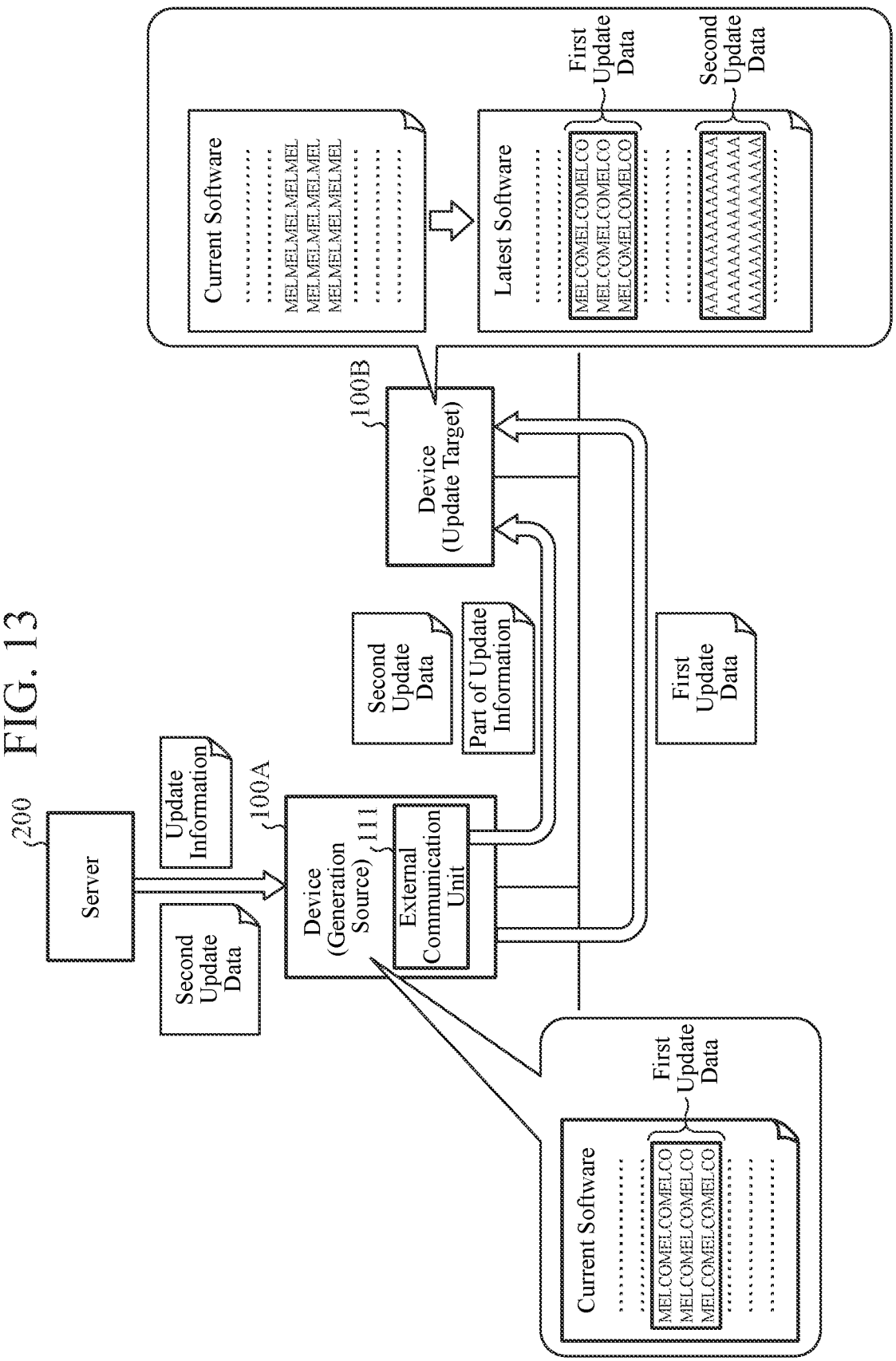
FIG. 13 is a diagram illustrating an outline of a software update system according to a second embodiment.

FIG. 13 is a diagram illustrating an outline of the software update system according to the second embodiment. In FIG. 13, a part which is the same as or corresponding to that in FIG. 1 to FIG. 12 is denoted by the same symbol and description thereof is omitted. Moreover, the configurations of a software update device 2 and the server 200 according to the second embodiment are the same as the configurations illustrated in FIGS. 2 to 4 of the first embodiment in the drawings, and thus FIGS. 2 to 4 are referred to hereinbelow.

Figure 14:
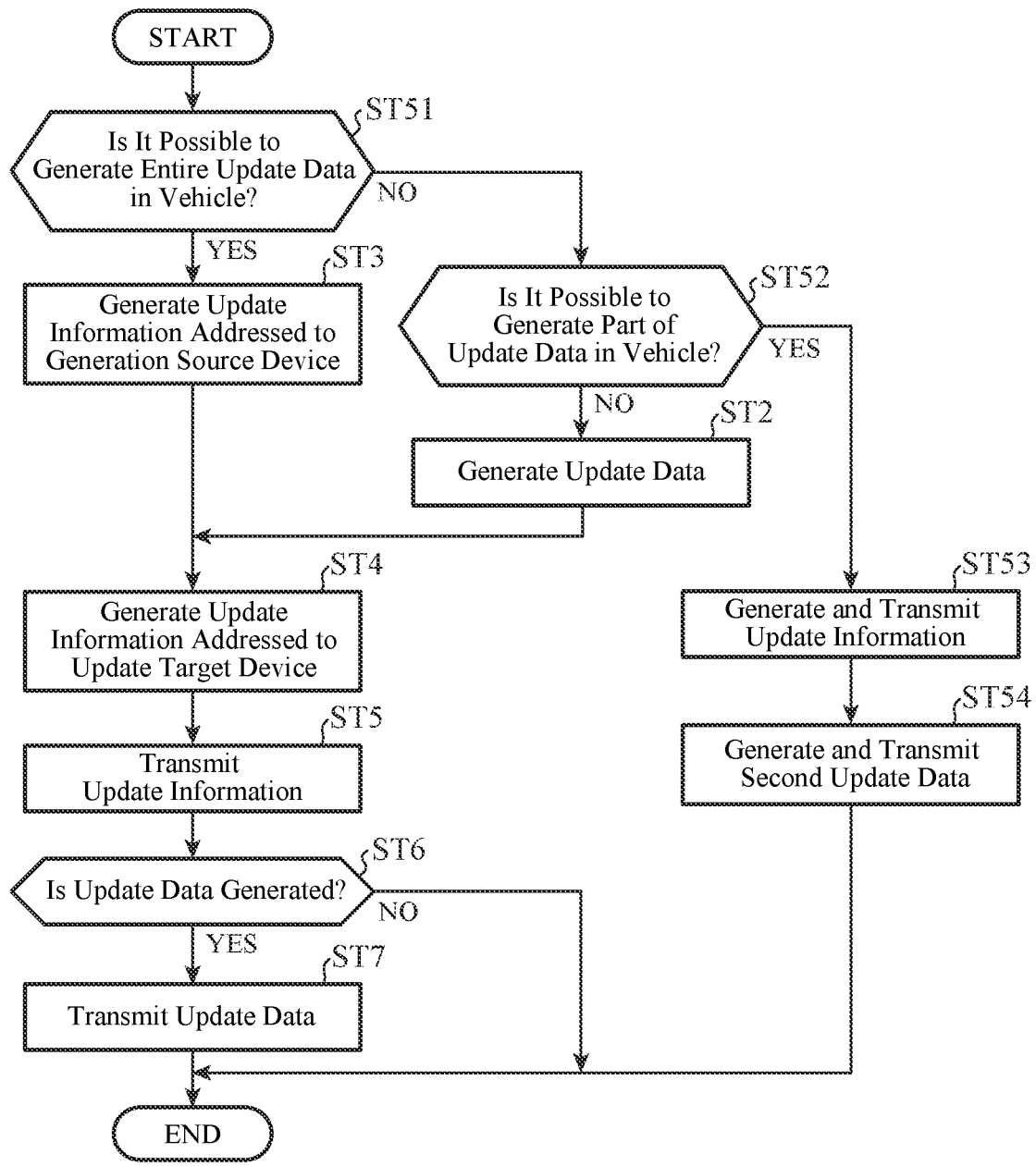
FIG. 14 is a flowchart illustrating an operation example of a server according to the second embodiment.

FIG. 14 is a flowchart illustrating an operation example of the server 200 according to the second embodiment. In a case where the server 200 receives an instruction to update software installed in any one of the devices 100A to 100E externally, the server 200 performs the operation illustrated in the flowchart of FIG. 14. The operations of steps ST2 to ST7 illustrated in the flowchart of FIG. 14 are similar to the operations of steps ST2 to ST7 illustrated in the flowchart of FIG. 5.

In step ST51, the update data generation determining unit 211 determines whether or not the entire update data for an update target device can be generated by at least one of devices other than the update target device. If at least one device other than the update target device can generate the entire update data (step ST51 "YES"), the update information generating unit 212 performs the operation of step ST3, and if not (step ST51 "NO"), the update data generation determining unit 211 performs the operation of step ST52.

In step ST52, the update data generation determining unit 211 determines whether or not a part of the update data for the update target device can be generated by at least one of devices other than the update target device. If at least one device other than the update target device can generate a part of the update data (step ST52 "YES"), the update information generating unit 212 performs the operation of step ST53. If none of devices other than the update target device can generate a part of the update data (step ST52 "NO"), the update data generating unit 213 performs the operation of step ST2 since no update data can be generated by the devices 100A to 100E only.

In step ST53, the update information generating unit 212 generates update information addressed to a generation source device that generates first update data. This update information has the content similar to that of the update information illustrated in FIG. 7. The server-side communication unit 214 transmits the update information addressed to the generation source device generated by the update information generating unit 212 to the external communication unit 111.

In step ST54, the update data generating unit 213 generates second update data on the basis of software information managed by the update data generation determining unit 211. The server-side communication unit 214 transmits the second update data generated by the update data generating unit 213 to the external communication unit 111.

The devices 100A to 100E of the software update device 2 according to the second embodiment operate in accordance with the flowcharts illustrated in FIGS. 9 to 12 of the first embodiment.

As described above, the external communication unit 111 according to the second embodiment receives two items which are transmitted from the server 200 when the server 200 determines that the generation source device can generate a part of the update data. The two items include: update information which is related to the first update data, and which includes information indicating the update target device and information indicating the generation source device installed with the generation source software that is a source for generating the part of the update data; and the remaining part of the update data generated by the server 200. On the basis of the update information received by the external communication unit 111, the software update unit 113 updates the update target software installed in the host device using the part of the update data generated by the generation source device and the remaining part of the update data received by the external communication unit 111. As described above, since any one of the devices 100A to 100E of the vehicle 1 generates at least a part of the update data, the amount of data communication between the server 200 and the vehicle 1 can be reduced as compared with the case where the server 200 generates all the update data as in the related art.

In addition, the update data generating unit 213 according to the second embodiment generates, in a case where the update data generation determining unit 211 determines that a part of the update data can be generated on the basis of software installed in a device other than the update target device, the remaining part of the update data. The update information generating unit 212 generates update information including information indicating a generation source device installed with generation source software that is a source for generating the part of the update data and information indicating the update target device. The server-side communication unit 214 transmits, to the vehicle 1, the update information generated by the update information generating unit 212 and the remaining part of the update data generated by the update data generating unit 213. As described above, since the server 200 causes any one of the devices 100A to 100E of the vehicle 1 to generate at least a part of the update data, the amount of data communication between the server 200 and the vehicle 1 can be reduced as compared with the case where the server 200 generates all the update data as in the related art.

Third Embodiment

In a software update system according to a third embodiment, a server 200 changes, on the basis of the communication quality between a vehicle 1 and the server 200 and the data amount of update data, a device that generates the update data.

Figure 15:
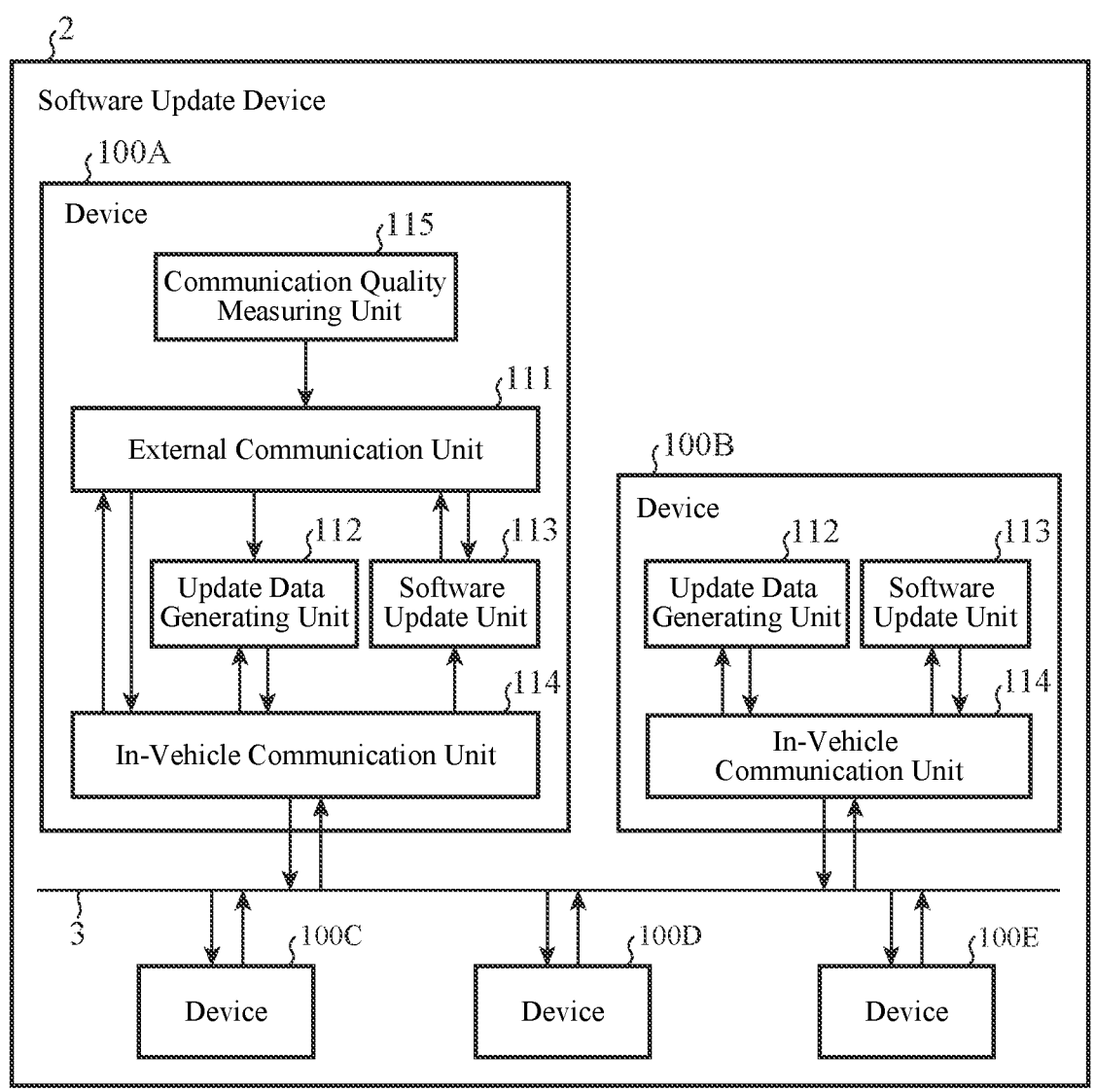
FIG. 15 is a functional block diagram illustrating a configuration example of a software update device according to a third embodiment.

FIG. 15 is a functional block diagram illustrating a configuration example of a software update device 2 according to the third embodiment. In FIG. 15, a part which is the same as or corresponding to that in FIG. 1 to FIG. 14 is denoted by the same symbol and description thereof is omitted. Note that the configuration of the server 200 according to the third embodiment is the same as those illustrated in FIGS. 2 and 4 of the first embodiment in the drawings, and thus FIGS. 2 and 4 are referred to hereinbelow.

Among a plurality of devices 100A to 100E, the device 100A including an external communication unit 111 includes a communication quality measuring unit 115. The communication quality measuring unit 115 measures the communication quality between the external communication unit 111 and the server-side communication unit 214, and outputs information indicating the communication quality that has been measured to the external communication unit 111. The external communication unit 111 periodically transmits information indicating the communication quality to the server-side communication unit 214. The communication quality refers to the radio wave strength, the reception bit rate, or the like.

A software update method of the third embodiment has the following two types.

Type 1: The server 200 generates the entire update data. Type 1 corresponds to the operations of steps ST2 and ST4 to ST7 in FIGS. 5 and 14.

Type 2: At least one of the devices 100A to 100E generates first update data which is a part of update data, and the server 200 generates second update data which is a remaining part of the update data. Type 2 corresponds to the operations of steps ST53 and ST54 in FIG. 14.

The update data generation determining unit 211 of the server 200 determines in which of the above two types the software update is performed on the basis of the communication quality and the data amount of the update data.

Figure 16:
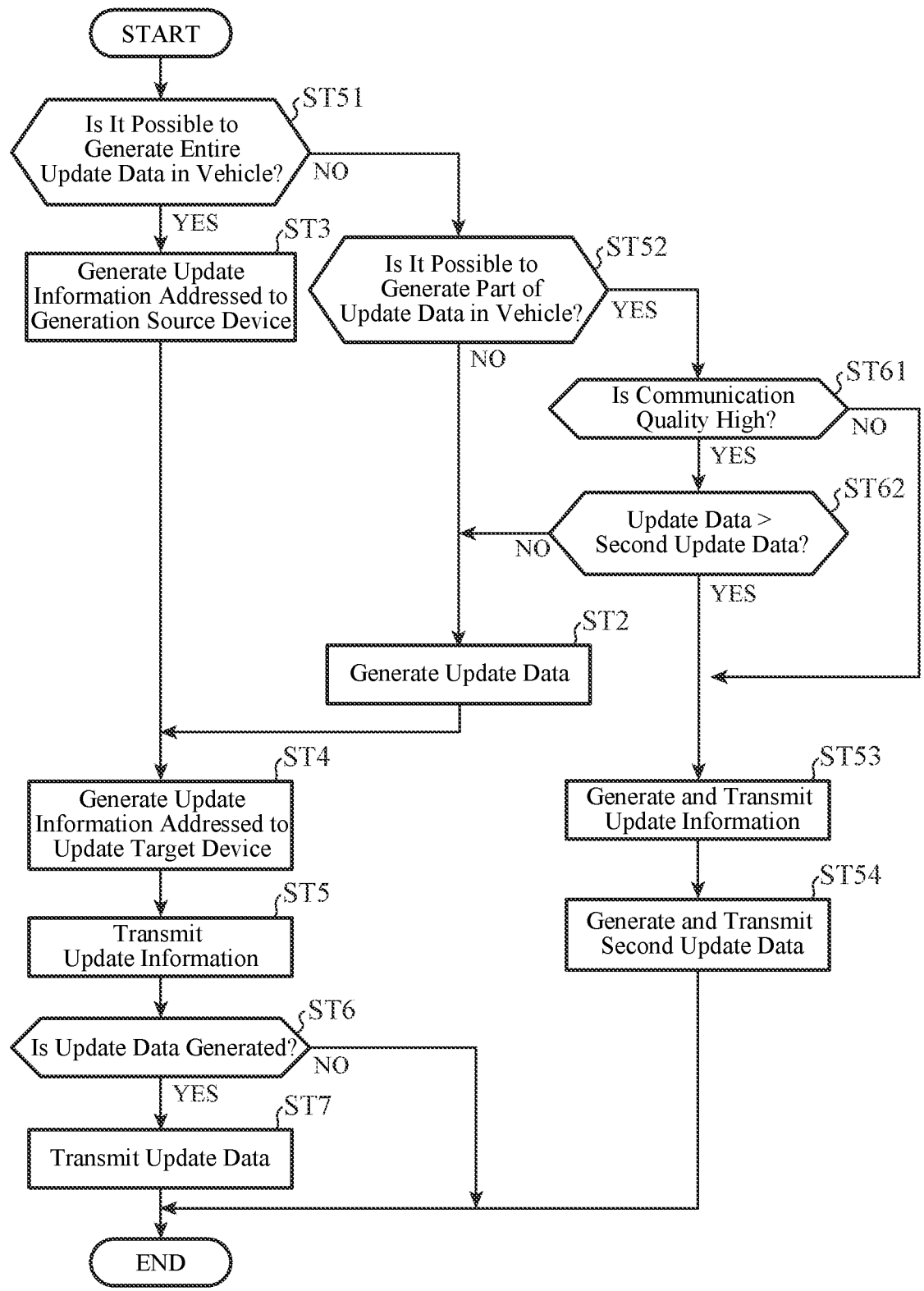
FIG. 16 is a flowchart illustrating an operation example of a server according to the third embodiment.

FIG. 16 is a flowchart illustrating an operation example of the server 200 according to the third embodiment. In a case where the server 200 receives an instruction to update software installed in any one of the devices 100A to 100E externally, the server 200 performs the operation illustrated in the flowchart of FIG. 16. The operations of steps ST2 to ST7 and ST51 to ST54 illustrated in the flowchart of FIG. 16 are similar to the operations of steps ST2 to ST7 and ST51 to ST54 illustrated in the flowchart of FIG. 14.

If at least one of the devices 100A to 100E can generate a part of update data (that is, first update data) (step ST52 "YES"), in step ST61, the server-side communication unit 214 receives information indicating the communication quality transmitted by the external communication unit 111, and outputs the information to the update data generation determining unit 211. The update data generation determining unit 211 determines whether or not the communication quality is equal to or higher than a predetermined threshold value. If the communication quality is less than the threshold value, that is, if the communication quality is low (step ST61 "NO"), the update data generation determining unit 211 selects type 2. Then, the server 200 performs the operations of steps ST53 and ST54. If the communication quality is low, it is desirable to suppress the amount of data communication between the server 200 and the vehicle 1, and thus the server 200 causes any one of the devices 100A to 100E to generate the first update data.

If the communication quality is equal to or higher than the threshold value, that is, if the communication quality is high (step ST61 "YES"), the update data generation determining unit 211 performs the operation of step ST62.

In step ST62, the update data generation determining unit 211 obtains the data amount of the first update data and the data amount of the second update data on the basis of software information. If the data amount of the second update data is smaller than the data amount of the entire update data (that is, the first update data and the second update data) (step ST62 "YES"), the update data generation determining unit 211 selects type 2. Then, the server 200 performs the operations of steps ST53 and ST54.

If the data amount of the second update data is the same as the data amount of the entire update data (step ST62 "NO"), the update data generation determining unit 211 selects type 1. Then, the server 200 performs the operations of steps ST2 and ST4 to ST7. Note that the data amount of the second update data and the data amount of the entire update data do not need to be exactly the same, and the update data generation determining unit 211 regards the two data amounts as being the same when a difference between the two data amounts is equal to or less than a predetermined value.

As described above, in the third embodiment, the device 100A including the external communication unit 111 includes the communication quality measuring unit 115 that measures the communication quality with the server 200. The external communication unit 111 transmits information indicating the communication quality measured by the communication quality measuring unit 115 to the server 200. The external communication unit 111 receives update data generated by the server 200 in a case where the server 200 determines that the communication quality is equal to or higher than the predetermined threshold value and determines that the data amount of the entire update data is the same as the data amount of the remaining part. On the other hand, the external communication unit 111 receives both update information related to a part of the update data and the remaining part of the update data generated by the server 200, in a case where the server 200 determines that the communication quality is equal to or higher than the threshold value and determines that the data amount of the remaining part is smaller than the data amount of the entire update data. In a case where the external communication unit 111 receives the update data, the software update unit 113 updates the update target software installed in the host device using the update data. Alternatively, in a case where the external communication unit 111 receives both the update information related to a part of the update data and the remaining part of the update data, the software update unit 113 updates the update target software installed in the host device using a part of the update data generated by the generation source device and the remaining part of the update data received by the external communication unit 111. In a case where the communication quality is high, even in a configuration in which the vehicle 1 receives the update data generated by the server 200, it does not take time to receive the data, and also there is no possibility that the data cannot be received. Therefore, in the vehicle 1 of the third embodiment, the software can be updated. In addition, in a case where the data amount of the entire update data and the data amount of second update data that can be generated only by the server 200 are substantially the same, the vehicle 1 receives the entire update data from the server 200, and thus the processing load for generating the update data is not applied to the generation source device.

The external communication unit 111 according to the third embodiment receives both update information related to a part of update data and the remaining part of the update data generated by the server 200, both the update information related to a part of update data and the remaining part of the update data being transmitted from the server 200 in a case where the server 200 determines that the communication quality is less than the threshold value. In a case where the external communication unit 111 receives both the update information related to a part of the update data and the remaining part of the update data, the software update unit 113 updates the update target software installed in the host device using a part of the update data generated by the generation source device and the remaining part of the update data received by the external communication unit 111. In a case where the communication quality is low, the vehicle 1 generates a part of the update data, and thus the amount of data communication between the server 200 and the vehicle 1 can be reduced. Therefore, even when the radio wave environment around vehicle 1 is poor, it is possible to perform the software update in the vehicle 1 of the third embodiment.

Moreover, in the third embodiment, the server-side communication unit 214 receives information indicating the communication quality measured in the vehicle 1. The update data generation determining unit 211 causes the update data generating unit 213 to generate update data in a case where the communication quality is equal to or higher than the predetermined threshold value and where the data amount of the entire update data and the data amount of the remaining part are the same. Meanwhile, in a case where the communication quality is equal to or higher than the threshold value and where the data amount of the remaining part is smaller than the data amount of the entire update data, the update data generation determining unit 211 causes the update information generating unit 212 to generate update information including information indicating a generation source device installed with generation source software that is a source for generating a part of the update data and information indicating an update target device, and causes the update data generating unit 213 to generate the remaining part of the update data. In a case where the communication quality is high, even in a configuration in which the vehicle 1 receives the update data generated by the server 200, it does not take time to receive the data, and also there is no possibility that the data cannot be received. Therefore, the server 200 of the third embodiment can cause the vehicle 1 to perform the software update. In addition, in a case where the data amount of the entire update data and the data amount of second update data that can be generated only by the server 200 are substantially the same, the server 200 transmits the entire update data, and thus the processing load for generating the update data is not applied to the generation source device.

In the third embodiment, in a case where the communication quality is less than the threshold value, the update data generation determining unit 211 causes the update information generating unit 212 to generate update information including information indicating a generation source device installed with generation source software that is a source for generating a part of the update data and information indicating an update target device, and causes the update data generating unit 213 to generate the remaining part of the update data. In a case where the communication quality is low, the server 200 causes the vehicle 1 to generate a part of the update data, and thus the amount of data communication between the server 200 and the vehicle 1 can be reduced. Therefore, the server 200 of the third embodiment can cause the vehicle 1 to update the software even when the radio wave environment around the vehicle 1 is poor.

Note that, in the above description, the number of update target devices is one; however, the number of update target devices may be plural. For example, in a case where there are a plurality of devices installed with the same software in the vehicle 1, the plurality of devices installed with the same software are update target devices.

The present invention may include a flexible combination of the embodiments, a modification of any component of the embodiments, or omission of any component of the embodiments within the scope of the present invention.

INDUSTRIAL APPLICABILITY

Since a software update system according to the present invention reduces the amount of data communication between a server and a vehicle, the software update system is suitable for use in a software update system or the like that performs software update for an in-vehicle device using OTA.

REFERENCE SIGNS LIST

1: vehicle, 2: software update device, 3, 204: communication bus, 100A to 100E: device, 101, 201: processor, 102, 202: memory, 103: external network IF, 104: in-vehicle network IF, 111: external communication unit, 112: update data generating unit, 113: software update unit, 114: in-vehicle communication unit, 115: communication quality measuring unit, 200: server, 203: server network IF, 211: update data generation determining unit, 212: update information generating unit, 213: update data generating unit, 214: server-side communication unit

The invention claimed is:

1. A software update device comprising a plurality of devices mounted on a vehicle,
wherein at least one of the plurality of devices comprises:
a network interface to receive, from a server outside the vehicle, update information including information indicating an update target device whose software is to be updated among the plurality of devices and information indicating a generation source device among the plurality of devices, the generation source device being installed with generation source software that is a source for generating update data to be used for updating update target software installed in the update target device, and
each of the plurality of devices comprises:
a processor to execute a program; and
a memory to store the program which, when executed by the processor, performs processes of,
generating, on a basis of the update information received by the network interface, the update data using the generation source software installed in a host device of the processor, in a case where the host device is the generation source device; and
updating, on a basis of the update information received by the network interface, the update target software installed in the host device using the update data generated by the generation source device, in a case where the host device is the update target device.

2. The software update device according to claim 1,
wherein, in a case where the network interface receives two items which are transmitted from the server when the server determines that the generation source device can generate a part of the update data, the two items including: update information including information indicating the update target device and information indicating the generation source device installed with generation source software that is a source for generating the part of the update data; and a remaining part of the update data generated by the server,
the program performs a process of updating, on a basis of the update information received by the network interface, the update target software installed in the host device using the part of the update data generated by the generation source device and the remaining part of the update data received by the network interface.

3. The software update device according to claim 2,
wherein the device comprising the network interface measures a communication quality with the server,
the network interface transmits information indicating the communication quality measured to the server, receives the update data generated by the server, the update data being transmitted from the server in a case where the server determines that the communication quality is equal to or higher than a predetermined threshold value and determines that a data amount of the entire update data is same as a data amount of the remaining part of the update data, and receives both update information related to the part of the update data and the remaining part of the update data generated by the server, both the update information related to the part of the update data and the remaining part of the update data being transmitted from the server in a case where the server determines that the communication quality is equal to or higher than the threshold value and determines that the data amount of the remaining part of the update data is smaller than the data amount of the entire update data, and the program performs, in a case where the network interface receives the update data, a process of updating the update target software installed in the host device using the update data, and performs, in a case where the network interface receives both the update information related to the part of the update data and the remaining part of the update data, a process of updating the update target software installed in the host device using the part of the update data generated by the generation source device and the remaining part of the update data received by the network interface.

4. The software update device according to claim 3, wherein the network interface receives both the update information related to the part of the update data and the remaining part of the update data generated by the server, both the update information related to the part of the update data and the remaining part of the update data being transmitted from the server in a case where the server determines that the communication quality is less than the threshold value, and in a case where the network interface receives both the update information related to the part of the update data and the remaining part of the update data, the program performs a process of updating the update target software installed in the host device using the part of the update data generated by the generation source device and the remaining part of the update data received by the network interface.

5. A software update system comprising:
a software update device comprising a plurality of devices mounted on a vehicle,
wherein at least one of the plurality of devices comprises:
a network interface to receive, from a server outside the vehicle, update information including information indicating an update target device whose software is to be updated among the plurality of devices and information indicating a generation source device among the plurality of devices, the generation source device being installed with generation source software that is a source for generating update data to be used for updating update target software installed in the update target device, and
each of the plurality of devices comprises:
a processor to execute a program; and
a memory to store the program which, when executed by the processor, performs processes of,
generating, on a basis of the update information received by the network interface, the update data using the generation source software installed in a host device of the processor, in a case where the host device is the generation source device; and
updating, on a basis of the update information received by the network interface, the update target software installed in the host device using the update data generated by the generation source device, in a case where the host device is the update target device; and the server comprising:
a processor to execute a program;
a memory to store the program which, when executed by the processor, performs processes of,
comparing update target software installed in an update target device whose software is to be updated among a plurality of devices mounted on a vehicle with software installed in rest of the devices, and thereby determining whether or not update data to be used for updating the update target software installed in the update target device can be generated on a basis of the software installed in the rest of the devices; and
setting, as a generation source device installed with generation source software that is a source for generating the update data, one of the devices which is determined to be capable of generating the update data, and generating update information including information indicating the generation source device and information indicating the update target device; and
a network interface to transmit the update information generated to the vehicle.

6. A software update method comprising:
by a server, comparing update target software installed in an update target device whose software is to be updated among a plurality of devices mounted on a vehicle with software installed in rest of the devices, and thereby determining whether or not update data to be used for updating the update target software installed in the update target device can be generated on a basis of the software installed in the rest of the devices;
by the server, setting, as a generation source device installed with generation source software that is a source for generating the update data, one of the devices which is determined to be capable of generating the update data, and generating update information including information indicating the generation source device and information indicating the update target device;
by the server, transmitting the generated update information to the vehicle;
by at least one of the plurality of devices, receiving the update information from the server;
by each of the plurality of devices, generating, on a basis of the update information received by the at least one of the plurality of devices, the update data using the generation source software installed in a corresponding one of the plurality of devices, in a case where the corresponding one is the generation source device; and
by each of the plurality of devices, updating, on a basis of the update information received by the at least one of the plurality of devices, the update target software installed in a corresponding one of the plurality of devices using the update data generated by the generation source device, in a case where the corresponding one is the update target device.

* * * * *